United States Patent
Inoue et al.

(10) Patent No.: US 8,249,258 B2
(45) Date of Patent: Aug. 21, 2012

(54) COMMUNICATION METHOD AND COMMUNICATION SYSTEM USING DECENTRALIZED KEY MANAGEMENT SCHEME

(75) Inventors: Daisuke Inoue, Koganei (JP); Masahiro Kuroda, Koganei (JP)

(73) Assignee: National Institute of Information and Communications Technology, Tokyo (JP)

( * ) Notice: Subject to any disclaimer, the term of this patent is extended or adjusted under 35 U.S.C. 154(b) by 1054 days.

(21) Appl. No.: 11/628,692

(22) PCT Filed: Dec. 8, 2004

(86) PCT No.: PCT/JP2004/019633
§ 371 (c)(1), (2), (4) Date: Sep. 14, 2007

(87) PCT Pub. No.: WO2005/122464
PCT Pub. Date: Dec. 22, 2005

(65) Prior Publication Data
US 2008/0165974 A1     Jul. 10, 2008

(30) Foreign Application Priority Data
Jun. 7, 2004   (JP) ................................. 2004-168682

(51) Int. Cl.
*G06F 21/00* (2006.01)
(52) U.S. Cl. .............. 380/281; 705/51; 705/52; 705/53; 705/54; 709/229; 455/433; 455/455
(58) Field of Classification Search .................... 380/281
See application file for complete search history.

(56) References Cited

U.S. PATENT DOCUMENTS

| | | | |
|---|---|---|---|
| 5,748,736 A * | 5/1998 | Mittra | 713/163 |
| 6,049,878 A * | 4/2000 | Caronni et al. | 726/3 |
| 6,240,188 B1 * | 5/2001 | Dondeti et al. | 380/284 |
| 6,901,510 B1 * | 5/2005 | Srivastava | 713/163 |
| 2002/0147906 A1* | 10/2002 | Lotspiech et al. | 713/158 |
| 2005/0141706 A1* | 6/2005 | Regli et al. | 380/44 |
| 2006/0059347 A1* | 3/2006 | Herz et al. | 713/176 |

OTHER PUBLICATIONS

A Key Management Solution for Overlay-Live-Streaming|http://www.tu-ilmenau.de/fileadmin/media/telematik/fischer/fischer07.pdf|pp. 1-9|May 2007.*

* cited by examiner

*Primary Examiner* — Taghi Arani
*Assistant Examiner* — Mahfuzur Rahman
(74) *Attorney, Agent, or Firm* — Brinks Hofer Gilson & Lione

(57) ABSTRACT

A decentralized key management scheme that implements key management of a tree structure comprised of only group members without using a key management server is proposed, and communication method and system that can contribute to secure group communications is provided. Each member constituting a group updates tree structure data of the entire group when a new member joins, respectively 70, and selects a captain in each subtree 71. Rather than the key management server, the captain generates a new key and shares it with other captains or the joining member 72, and distributes the new key to the members of the subtree 73, thereby enabling all the group members to update to the new key. A captain is also selected when a member leaves, and sharing and distribution of a new key by the captain is performed.

16 Claims, 15 Drawing Sheets

Fig. 8

| Join Protocol on the Dedicated Strategy |
|---|

(1) if $(l = 1)$ (2)     Update $T_{\langle 0,0 \rangle}$;

(3)     Select $C_{\langle 0,0 \rangle}$;

(4)     $M_{\langle 1,1 \rangle} \leftrightarrow C_{\langle 0,0 \rangle} : K'_{\langle 0,0 \rangle}$;

(5)*    $C_{\langle 0,0 \rangle} \to T_{\langle 1,0 \rangle} : E(K_{\langle 1,0 \rangle}, K'_{\langle 0,0 \rangle})$;

(6)     $K_{\langle 0,0 \rangle} := K'_{\langle 0,0 \rangle}$;

(7) else if $(l \geq 2)$ (8)     Update $T_{\langle l-1, \lfloor \frac{m}{2} \rfloor \rangle}$;

(9)     Select $C_{\langle l-i, \lfloor \frac{m}{2^i} \rfloor \rangle}$;

(10)    $M_{\langle l,m \rangle} \leftrightarrow C_{\langle l-i, \lfloor \frac{m}{2^i} \rfloor \rangle} : K'_{\langle l-i, \lfloor \frac{m}{2^i} \rfloor \rangle}$;

(11)    $C_{\langle l-j, \lfloor \frac{m}{2^j} \rfloor \rangle} \to T_{\langle l-j, \lfloor \frac{m}{2^j} \rfloor \rangle} :$
       $E(K_{\langle l-j, \lfloor \frac{m}{2^j} \rfloor \rangle}, K'_{\langle l-j, \lfloor \frac{m}{2^j} \rfloor \rangle})$;

(12)*   $C_{\langle l-1, \lfloor \frac{m}{2} \rfloor \rangle} \to T_{\langle l, m+(-1)^m \rangle} :$
       $E(K_{\langle l, m+(-1)^m \rangle}, K'_{\langle l-1, \lfloor \frac{m}{2} \rfloor \rangle})$;

(13)    $K_{\langle l-i, \lfloor \frac{m}{2^i} \rfloor \rangle} := K'_{\langle l-i, \lfloor \frac{m}{2^i} \rfloor \rangle}$;

\* if needed

Fig. 9

| Join Protocol on the Distributed Strategy |
|---|
| (1) if ($l = 1$) |
| (2)-(6) Similar to the join protocol on the dedicated strategy |
| (7) else if ($l \geq 2$) |
| (8) Update $T_{\langle l-1, \lfloor \frac{m}{2} \rfloor \rangle}$; |
| (9) Select $C_{\langle l-i, \lfloor \frac{m}{2^i} \rfloor \rangle}$; |
| (10) $M_{\langle l,m \rangle} \leftrightarrow C_{\langle l-1, \lfloor \frac{m}{2} \rfloor \rangle} : K'_{\langle l-1, \lfloor \frac{m}{2} \rfloor \rangle}$; |
| (11) $C_{\langle l-(j-1), \lfloor \frac{m}{2^{j-1}} \rfloor \rangle} \leftrightarrow C_{\langle l-j, \lfloor \frac{m}{2^j} \rfloor \rangle} : K'_{\langle l-j, \lfloor \frac{m}{2^j} \rfloor \rangle}$; |
| (12) $C_{\langle l-j, \lfloor \frac{m}{2^j} \rfloor \rangle} \to T_{\langle l-j, \lfloor \frac{m}{2^j} \rfloor \rangle} : E(K_{\langle l-j, \lfloor \frac{m}{2^j} \rfloor \rangle}, K'_{\langle l-j, \lfloor \frac{m}{2^j} \rfloor \rangle})$; |
| (13)* $C_{\langle l-1, \lfloor \frac{m}{2} \rfloor \rangle} \to T_{\langle l, m+(-1)^m \rangle} : E(K_{\langle l, m+(-1)^m \rangle}, K'_{\langle l-1, \lfloor \frac{m}{2} \rfloor \rangle})$; |
| (14) $C_{\langle l-(j-1), \lfloor \frac{m}{2^{j-1}} \rfloor \rangle} \to M_{\langle l,m \rangle} : E(K'_{\langle l-(j-1), \lfloor \frac{m}{2^{j-1}} \rfloor \rangle}, K'_{\langle l-j, \lfloor \frac{m}{2^j} \rfloor \rangle})$; |
| (15) $K_{\langle l-i, \lfloor \frac{m}{2^i} \rfloor \rangle} := K'_{\langle l-i, \lfloor \frac{m}{2^i} \rfloor \rangle}$; |
| * if needed |

Fig. 10

| Leave Protocol on the Dedicated Strategy |
|---|
| (1) if $(l = 1)$ |
| (2)    Remove $\langle 0, 0 \rangle$; |
| (3)    Update $T_{\langle 1, m+(-1)^m \rangle}$; |
| |
| (4) else if $(l = 2)$ |
| (5)    Select $C_{\langle 1, \lfloor \frac{m}{2} \rfloor \rangle}$ and $C_{\langle 0,0 \rangle}$; |
| (6)    $C_{\langle 1, \lfloor \frac{m}{2} \rfloor \rangle} \leftrightarrow C_{\langle 0,0 \rangle} : K'_{\langle 0,0 \rangle}$; |
| (7)*   $C_{\langle 0,0 \rangle} \to T_{\langle 1, \lfloor \frac{m}{2} \rfloor + (-1)^{\lfloor \frac{m}{2} \rfloor} \rangle}$ : $E(K_{\langle 1, \lfloor \frac{m}{2} \rfloor + (-1)^{\lfloor \frac{m}{2} \rfloor} \rangle}, K'_{\langle 0,0 \rangle})$; |
| (8)*   $C_{\langle 1, \lfloor \frac{m}{2} \rfloor \rangle} \to T_{\langle 2, m+(-1)^m \rangle}$ : $E(K_{\langle 2, m+(-1)^m \rangle}, K'_{\langle 0,0 \rangle})$; |
| (9)    $K_{\langle 0,0 \rangle} := K'_{\langle 0,0 \rangle}$; |
| (10)   Update $T_{\langle 1, \lfloor \frac{m}{2} \rfloor \rangle}$; |
| |
| (11) else if $(l \geq 3)$ |
| (12)   Select $C_{\langle l-i, \lfloor \frac{m}{2^i} \rfloor \rangle}$; |
| (13)   $C_{\langle l-1, \lfloor \frac{m}{2} \rfloor \rangle} \leftrightarrow C_{\langle l-j, \lfloor \frac{m}{2^j} \rfloor \rangle} : K'_{\langle l-j, \lfloor \frac{m}{2^j} \rfloor \rangle}$; |
| (14)*  $C_{\langle l-j, \lfloor \frac{m}{2^j} \rfloor \rangle} \to T_{\langle l-(j-1), \lfloor \frac{m}{2^{j-1}} \rfloor + (-1)^{\lfloor \frac{m}{2^{j-1}} \rfloor} \rangle}$ : $E(K_{\langle l-(j-1), \lfloor \frac{m}{2^{j-1}} \rfloor + (-1)^{\lfloor \frac{m}{2^{j-1}} \rfloor} \rangle}, K'_{\langle l-j, \lfloor \frac{m}{2^j} \rfloor \rangle})$; |
| (15)*  $C_{\langle l-1, \lfloor \frac{m}{2} \rfloor \rangle} \to T_{\langle l, m+(-1)^m \rangle}$ : $E(K_{\langle l, m+(-1)^m \rangle}, K'_{\langle l-2, \lfloor \frac{m}{2^2} \rfloor \rangle})$; |
| (16)   $C_{\langle l-1, \lfloor \frac{m}{2} \rfloor \rangle} \to T_{\langle l-k, \lfloor \frac{m}{2^k} \rfloor \rangle}$ : $E(K'_{\langle l-k, \lfloor \frac{m}{2^k} \rfloor \rangle}, K'_{\langle l-(k+1), \lfloor \frac{m}{2^{k+1}} \rfloor \rangle})$; |
| (17)   $K_{\langle l-j, \lfloor \frac{m}{2^j} \rfloor \rangle} := K'_{\langle l-j, \lfloor \frac{m}{2^j} \rfloor \rangle}$; |
| (18)   Update $T_{\langle l-1, \lfloor \frac{m}{2} \rfloor \rangle}$; |
| |
| *if needed |

*Fig. 11*

| Leave Protocol on the Distributed Strategy |
|---|
| (1) if $(l = 1)$ |
| (2)-(3) Similar to the leave protocol on the dedicated strategy |
| (4) else if $(l = 2)$ |
| (5)-(10) Similar to the leave protocol on the dedicated strategy |
| (11) else if $(l \geq 3)$ |
| (12)   Select $C_{\langle l-i, \lfloor \frac{m}{2^i} \rfloor \rangle}$; |
| (13)   $C_{\langle l-(j-1), \lfloor \frac{m}{2^{j-1}} \rfloor \rangle} \leftrightarrow C_{\langle l-j, \lfloor \frac{m}{2^j} \rfloor \rangle} : K'_{\langle l-j, \lfloor \frac{m}{2^j} \rfloor \rangle}$; |
| (14)* $C_{\langle l-j, \lfloor \frac{m}{2^j} \rfloor \rangle} \rightarrow T_{\langle l-(j-1), \lfloor \frac{m}{2^{j-1}} \rfloor + (-1)^{\lfloor \frac{m}{2^{j-1}} \rfloor} \rangle} :$ $E(K_{\langle l-(j-1), \lfloor \frac{m}{2^{j-1}} \rfloor + (-1)^{\lfloor \frac{m}{2^{j-1}} \rfloor} \rangle}, K'_{\langle l-j, \lfloor \frac{m}{2^j} \rfloor \rangle})$; |
| (15)* $C_{\langle l-1, \lfloor \frac{m}{2} \rfloor \rangle} \rightarrow T_{\langle l, m+(-1)^m \rangle} :$ $E(K_{\langle l, m+(-1)^m \rangle}, K'_{\langle l-2, \lfloor \frac{m}{2^2} \rfloor \rangle})$; |
| (16)   $C_{\langle l-k, \lfloor \frac{m}{2^k} \rfloor \rangle} \rightarrow T_{\langle l-k, \lfloor \frac{m}{2^k} \rfloor \rangle} :$ $E(K'_{\langle l-k, \lfloor \frac{m}{2^k} \rfloor \rangle}, K'_{\langle l-(k+1), \lfloor \frac{m}{2^{k+1}} \rfloor \rangle})$; |
| (17)   $K_{\langle l-j, \lfloor \frac{m}{2^j} \rfloor \rangle} := K'_{\langle l-j, \lfloor \frac{m}{2^j} \rfloor \rangle}$; |
| (18)   Update $T_{\langle l-1, \lfloor \frac{m}{2} \rfloor \rangle}$; |
| *if needed |

COMMUNICATION METHOD AND COMMUNICATION SYSTEM USING
DECENTRALIZED KEY MANAGEMENT
SCHEME

TECHNICAL FIELD

The present invention relates to communication method and system wherein members of a group in a communications network share a group key and perform communications encrypted by the key. More specifically, it relates to configuration of managing a group key by a decentralized key management scheme.

BACKGROUND ART

In recent years, kicked off by diffusion of mobile phones, commercial realization as well as research and development of mobile security technology have increased. Advances have been made in studies of next-generation mobile communication networks that could seamlessly integrate radio transmission having various characteristics, such as a cellular network of 2G or 3G, and that are disclosed, for example, in a non-patent document 1 by the present inventors.

The next-generation communication networks have the capability of automatically selecting optimal radio transmission according to mobile service to be used, and the architecture as disclosed in a non-patent document 2 in which various radio transmissions are able to plug in a same network in a flexible manner is assumed.

Non-Patent Document 1: M. Kuroda, M. Inoue, A. Okubo, T. Sakakura, K. Shimizu, and F. Adachi, "Scalable Mobile Ethernet and Fast Vertical Handover," Proc. IEEE Wireless Communications and Networking Conference 2004, March 2004.

Non-Patent Document 2: M. Yoshida, M. Kuroda, S. Kiyomoto, and T. Tanaka, "A Secure Service Architecture for Beyond 3G Wireless Network," Proc. $6^{th}$ International Symposium on Wireless Personal Multimedia Communications, Vol. 2, pp. 579-583, 2003.

In a next-generation mobile communication network, expectations are placed on not only conventional services of the client-server type but also services of a group type wherein a plurality of users use a variety of portable terminals and form a dynamic group whereby the members can securely share information with each other. Although the capabilities required for implementing such secure group communications include confidentiality of data, verification of integrity, authentication of a sender, management of members, etc., management of a group key to be shared by group members is a critical study subject as well.

In a dynamic group which members can possibly join/leave, a group key should be updated so that a member who newly joins a group (hereinafter referred to as a joining member) cannot gain access to any information before he/she joins or a member who leaves a group (hereinafter referred to as a leaving member) cannot gain access to any information after he/she leaves.

The key management scheme capable of updating a group key is roughly divided into the following: a scheme that needs a server for intensively managing a key or radio stations (as disclosed in a non-patent document 3 or 11), and a scheme known as Contributory Key Agreement in which all group members cooperate in sharing a DH key and update a group key (as disclosed in a non-patent document 12 or 16).

Needless to say, sharing of the DH key is the key sharing scheme developed by (Mr.) Diffie and (Mr.) Hellman that utilizes a discrete logarithm problem and communicates published information (a public key) generated from random numbers and a secret key, and not a secret key itself. This could prevent a secret key from being decrypted (known) immediately even if a third person wiretapped communication, thereby making it possible to ensure key information to be shared securely.

Non-Patent Document 3: H. Harney, C. Muckenhirn, and T. Rivers, "Group Key Management Protocol (GKMP) Specification," IETF, RFC 2093, 1997.

Non-Patent Document 4: H. Harney, C. Muckenhirn, and T. Rivers, "Group Key Management Protocol (GKMP) Architecture," IETF, RFC 2094, 1997.

Non-Patent Document 5: D. Wallner, E. Harder, R. Agee, "Key Management for Multicast: Issues and Architectures," IETF, RFC 2627, 1999.

Non-Patent Document 6: C. K. Wong, M. Gouda, and S. Lam, "Secure Group Communication Using Key Graphs," IEEE/ACM Trans. on Networking, Vol. 8, No. 1, pp. 16-30, 2000.

Non-Patent Document 7: R. Canetti, J. Garay, G. Itkis, D. Micciancio, M. Naor, and B. Pinkas, "Multicast Security: A Taxonomy and Efficient Constructions," Proc. IEEE Infocom '99, Vol. 2, pp. 708-716, 1999.

Non-Patent Document 8: D. A. McGrew, and A. T. Sherman, "Key Establishment in Large Dynamic Groups Using On-Way Function Trees," IEEE Trans. on Software Engineering, Vol. 29, No. 5, pp. 444-458, 2003.

Non-Patent Document 9: A. Perrig, D. Song, and J. D. Tygar, "ELK: A New Protocol for Efficient Large-Group Key Distribution," Proc. IEEE Security and Privacy Symposium, pp. 247-262, 2001.

Non-Patent Document 10: A. Perrig, R. Szewczyk, V. Wen, D. Culler, and J. D. Tygar, "SPINS: Security Protocols for Sensor Networks," Proc. Mobile Computing and Networking 2001, pp. 189-199, 2001.

Non-Patent Document 11: Y. W. Law, R. Corin, S. Etalle, and P. H. Hartel, "A Formally Verified Decentralized Key Management Architecture for Wireless Sensor Networks," Proc. Personal Wireless Communications 2003, pp. 27-39, 2003.

Non-Patent Document 12: D. G. Steer, L. Strawczynski, W. Diffie, and M. Wiener, "A Secure Audio Teleconference System," Proc. Advances in Cryptology-CRYPTO '88, pp. 520-528, 1988.

Non-Patent Document 13: M. Burmester, and Y. Desmedt, "A Secure and Efficient Conference Key Distribution System," Proc. Advances in Cryptology-EUROCRYPT '94, pp. 275-286, 1994.

Non-Patent Document 14: M. Steiner, G. Tsudik, and M. Waidner, "Key Agreement in Dynamic Peer Groups," IEEE Trans. On Parallel and Distributed Systems, Vol. 11, No. 8, pp. 769-780, 2000.

Non-Patent Document 15: J. Alves-Foss, "An Efficient Secure Authenticated Group Key Exchange Algorithm for Large and Dynamic Groups," Proc. $23^{rd}$ National Information Systems Security Conference, pp. 254-266, 2000.

Non-Patent Document 16: Y. Kim, A. Perrig, and G. Tsudik, "Simple and Fault-Tolerant Key Agreement for Dynamic Collaborative Groups," ACM Conference on Computer and Communications Security 2000, pp. 235-244, 2000.

In the former scheme, an entity that intensively manages the key may possibly be a Single Point of Failure, and is difficult to apply to serverless group communications such as an Ad Hoc network, etc. In the latter scheme, all group members are required to execute a power-residue operation when updating a group key, which is unfit for group communications including portable terminals with poor calculating ability, etc.

As the conventional method of updating a group key, a scheme known as Logical Key Hierarchy (LKH) (disclosed in non-patent documents 5 and 6) that manages a key in a tree structure is highly effective.

However, not only such the method of intensively managing the key suffers from the problems described above, but also a key management scheme that involves less cost when a member joins or leaves is anticipated.

As a patent document that uses a key management server, the technology disclosed in a patent document 17 or 18 has been known. The patent document 17 discloses a scheme in which a key management server exercises collective control, and then there is a problem that updating a key becomes more costly if a group involved has a large scale. In the patent document 18, a sub-group key management server that manages sub-groups is separately provided. However, because the server only manages a key, a server at higher level in the tree structure manages.

Patent Document 17: Japanese Patent Application Laid-Open No. 9-319673
Patent Document 18: Japanese Patent Application Laid-Open No. 2004-023237

DISCLOSURE OF THE INVENTION

Problems to be Solved by the Invention

The present invention has been made in light of the conventional technology described above, suggests a decentralized key management scheme for implementing key management in a tree structure of only group members without using a key management server, and thus aims to provide communication method and system that contribute to secure group communications.

Means for Solving the Problems

The present invention provides the following communication method in order to achieve the above object.

The invention according to claim 1 is a communications method for used in a communication network, wherein a group to which a plurality of members can join is organized, a group key for use in encryption or authentication of communication data is not only shared in the group, but also assigned to a most significant root, a subgroup key is assigned to nodes that are branching points of branches, each member is assigned to a leaf at the end of a least significant subtree, and each member communicates by retaining the group key and all subgroup keys from the group key to itself.

Each member belonging to the group stores in advance tree structure data of the entire group, the group key, and all the subgroup keys, and when each member detects that a new member joins by joining/leaving detection means, the method includes the following steps:

(1) A tree structure data updating step in which each member causes tree structure data updating means to assign a joining member to a leaf of the tree structure according to a predetermined rule, and to update the tree structure data stored by each member;

(2) A captainship determination step in which each member causes captainship determination means to determine whether or not the member will be a captain of a subtree according to a predetermined rule from new tree structure data; and (3) A new key generation and distribution step in which the captain causes new key generation and distribution means to generate and distribute new keys at least among respective members of its subtree.

The invention according to claim 2 is characterized in that the new key generation and distribution step in the communication method according to claim 1 includes: a new key sharing step in which the joining member and each captain cause the new key sharing means to communicate generation information of a new group key or subgroup keys, and generate and share a new key; and a new key distribution step in which each captain causes the new key distribution means to encrypt the new key with the prior group key or subgroup keys, and distribute the key(s) to each member of the subtree.

The invention according to claim 3 is characterized in that the new key generation and distribution step in the communication method according to claim 1 includes: a new key sharing step in which not only a joining member and a least significant captain share a new key, but also lower captains sequentially share a new key with a captain at one level higher in the hierarchy; and a new key distribution step in which each captain causes the new key distribution means not only to encrypt the new key with the corresponding prior group key or subgroup keys and distribute the key(s) to each member of the subtree, but also to encrypt a new key of one level higher in the hierarchy with the new key of the subtree to which the captain belongs and to transmit the encrypted key to the joining member sequentially from the lower captains.

The invention according to claim 4 is characterized in that, in the tree structure data updating step of the invention according to claim any of claims 1 to 3, the predetermined rule for assigning a joining member to a leaf assigns it as the leftmost leaf in the least significant node at the rightmost in the entire tree structure, or as the rightmost leaf in the least significant node at the leftmost.

The invention according to claim 5 is characterized in that, in the captainship determination step of the invention according to any of claims 1 to 3, a predetermined rule for determining whether to be a captain or not selects a captain candidate member in a subtree from members of leaves of a branch opposite to a branch where a joining member lies, when viewed from the high level of the subtree.

The invention according to claim 6 is characterized in that the tree structure is a two-part tree.

The invention according to claim 7 is characterized by, when each member detects that a member leaves by joining/leaving detection means, including the following steps:

(1) A captainship determination step in which each member causes captainship determination means to determine whether or not the member will be a captain in a subtree from the tree structure data excluding the leaving member according to a predetermined rule;

(2) A new key generation and distribution step in which the captain causes new key generation and distribution means to generate and distribute new keys among at least its subtree members and other captains; and (3) A tree structure data updating step in which each member causes tree structure data updating means to re-assign members of the subtree to which the leaving member belongs and updates the tree structure data stored in the member according to a predetermined rule.

The invention according to claim 8 is characterized in that the new key generation and distribution step in the communication method includes: a new key sharing step in which captains in the least significant subtree where the member has left and all other captains in the subtree to which the leaving member belong cause new key sharing means to communicate generation information on a new group key or subgroup keys and generate and share the new key; and a new key distribution step in which not only each captain causes new key distribution means to encrypt the generated new key with the prior subgroup key of one level lower in the hierarchy and to distribute it to each member of the subtree, but also the captain in the least significant subtree where the member has left causes the new key distribution means to encrypt the missing new key with the prior subgroup key of the subtree, and to distribute it to each member of the subtree.

The invention according to claim 9 is characterized in that the new key generation and distribution step in the communication method includes: a new key sharing step in which starting with captains of the least significant subtree where the member has left, the lower captain sequentially shares the new key with the captain of one level higher in the hierarchy; and a new key distribution step in which each captain not only causes new key distribution means to distribute a new key to each member of its subtree, but also the captain of the subtree where the member has left causes the new key distribution means to encode a missing new key with the prior subgroup key of that subtree and distribute it to each member of the subtree.

The invention according to claim 10 is characterized in that, in the captainship determination step, the predetermined rule for determining whether to be a captain or not selects a captain candidate member in a subtree from members of leaves of a branch opposite to a branch where the joining member lies, when viewed from the higher level of the subtree.

The invention according to claim 11 is the invention according to any of claims 7 to 10, wherein the tree structure is a two-part tree.

The invention can provide the following communication system.

According to the invention of claim 12, there is provided a communications method for used in a communication network, wherein a group to which a plurality of members can join is organized, a group key for use in encryption or authentication of communication data is not only shared in the group, but also assigned to a most significant root, a subgroup key is assigned to nodes that are branching points of branches, each member is assigned to a leaf at the end of a least significant subtree, and each member communicates by retaining the group key and all subgroup keys from the group key to itself.

A terminal unit that is each member comprises the following means:

(1) storage means for storing tree structure data of an entire group, a group key, and all subgroup keys;

(2) joining/leaving detection means for detecting joining of a new member or leaving of a member;

(3) tree structure data updating means for either assigning a joining member to a leaf of a tree structure according to a predetermined rule and updating tree structure data stored therein, or re-assigning members of the subtree to which a leaving member belong as a leaf according to a predetermined rule and updating tree structure data stored therein;

(4) captainship determination means for determining, from the tree structure data, whether or not the member will be a captain of the subtree according to a predetermined rule; and (5) new key generation and distribution means for generating and distributing a new key at least among members of its subtree, when it becomes a captain.

The invention according to claim 13 is characterized in that the new key generation and distribution means in the communication system includes: new key sharing means for communicating generation information of a new group key or subgroup keys among the joining member and captains, and generating and sharing a new key; and new key distribution means for encrypting the new key with corresponding prior group key or subgroup key, and distributing it to each member of the subtree.

The invention according to claim 14 is characterized in that the new key generation and distribution means in the communication system includes: new key sharing means in which not only the joining member and the least significant captain share a new key, but also lower captains sequentially share the new key with the captain of one level higher in the hierarchy; and new key distribution means for, when a member is a captain, not only encrypting a new key with the corresponding prior group key or subgroup keys and distributing it to each member of the subtree, but also starting with the lower captains, sequentially encrypting a new key of one level higher in the hierarchy with the new key of the subtree to which the captain belongs and transmit it to the joining member.

The invention according to claim 15 is characterized in that the new key generation and distribution means of a terminal unit in the communication system includes: new key sharing means in which the captain of the least significant subtree where the member has left and all other captains of the subtree to which the leaving member belongs communicate generation information on a new group key and subgroup keys, and generate and share a new key; and new key distribution means for, when a member is a captain, not only encrypting the generated new key with the prior subgroup keys at one level lower in the hierarchy and distributing it to each member of the subtree, but also causing the captain of the least significant subtree where the member has left to encrypt the missing new key with the prior subgroup keys of that subtree and distribute it to each member of the subtree.

The invention according to claim 16 is characterized in that the new key generation and distribution means of the terminal unit in the communication system includes: new key sharing means in which starting with the captains of the least significant subtree where the member has left, the lower captains sequentially share a new key with the captain of one level higher in the hierarchy; and new key distribution means for, when a member is a captain, not only causing the new key distribution means to distribute the new key to each member of its subtree, but also causing the captain of the subtree where the member has left to encrypt the missing new key with the prior subgroup key of that subtree and distribute it to each member of the subtree.

The invention according to claim 17 is characterized in that, in the communication system according to any of claims 12 to 16, the predetermined rule for assigning a joining member to be used in the tree structure data updating means to a leaf assigns as the leftmost leaf in the least significant node at the rightmost in the entire tree structure, or as the rightmost leaf in the least significant node at the leftmost.

The invention according to claim 18 is characterized in that the predetermined rule for determining whether or not to be a captain to be used in the captainship determination means selects a captain candidate member in a subtree from members of leaves of a branch opposite to the branch on which a joining member lies, when viewed from the higher level of the subtree.

The invention according to claim 19 is characterized in that, in the communication system according to any of claims 12 to 18, the tree structure is a two-part tree.

EFFECT OF THE INVENTION

With the above invention, the following effects can be achieved.

In fact, according to the communication method using the decentralized key management scheme as of claim 1 or 6, the key management scheme can be provided wherein secure sharing of a group key can be ensured in serverless manner when a member join, which also contributes to cost reduction.

According to the communication method using the decentralized key management scheme as of claim 7 or 11, the key management scheme can be provided wherein secure sharing of a group key can be ensured in serverless manner when a member leaves, which also contributes to cost reduction.

According to the invention as of claim 12 or 19, the communication system that incorporates the above communication method and uses the decentralized key management scheme can be provided.

BRIEF DESCRIPTION OF DRAWINGS

FIG. 8 is a flow chart of the join protocol according to a second embodiment of the present invention.

FIG. 9 is a flow chart of the join protocol according to a third embodiment of the present invention.

FIG. 10 is a flow chart of the leave protocol according to a fourth embodiment of the present invention.

FIG. 11 is a flow chart of the leave protocol according to a fifth embodiment of the present invention.

Description of Reference Numerals

70 Tree structure data updating step
71 Captain selecting step
72 New key sharing step
73 New key distributing step

BEST MODE FOR CARRYING OUT THE INVENTION

In the following, embodiments of the present invention will be described with reference to Examples shown in appended drawings. The embodiments shall not be limited to the following.

EXAMPLE 1

Figure 1:
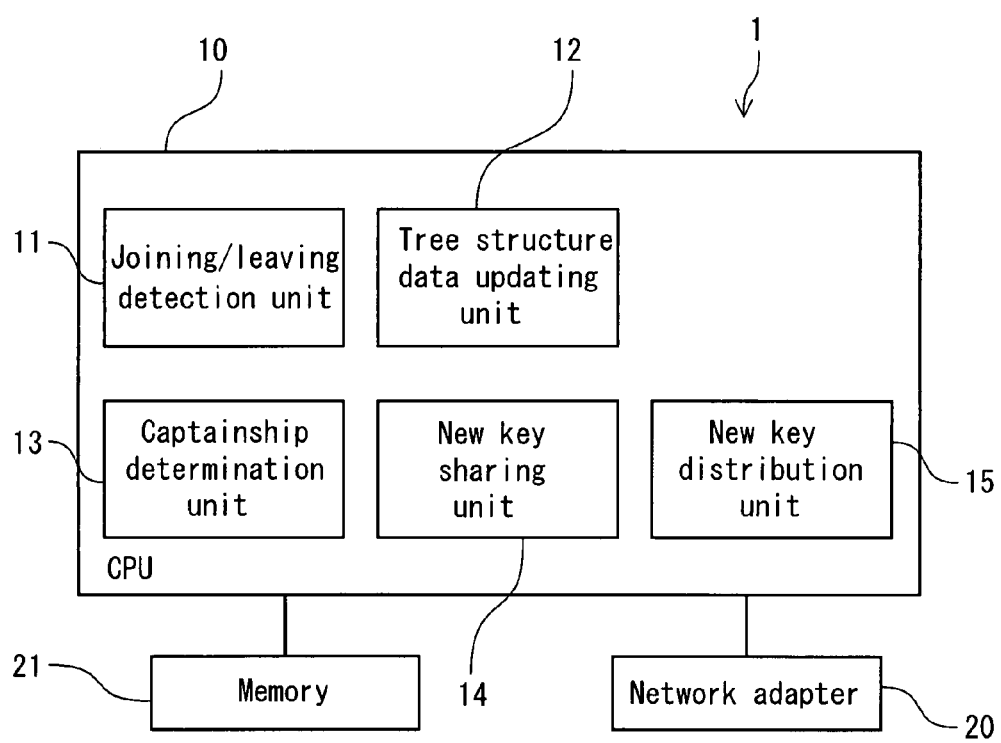
FIG. 1 is a block diagram of a terminal unit comprising a communication system according to the present invention.

FIG. 1 is a block diagram of a terminal unit in a communication system according to the present invention. As shown, a CPU (10), a network adaptor (20) for controlling network communications, and a memory (21) for storing data are attached to a terminal unit (1). As a known personal computer, a mobile phone unit, a portable information communication terminal are provided with such a configuration, the present invention can be incorporated in these devices.

Then, the CPU (10) is responsible for a process by a joining/leaving detection unit (11) that detects joining or leaving of any other member comprising a group on a network and a process by a tree structure data updating unit (12) that updates and processes tree structure data for managing a key by a group as a whole. In addition, it also performs respective processes of a captainship determination unit (13), a new key sharing unit (14), and a new key distribution unit (15), for implementing the method of the invention.

In addition, as key generation and sharing processes according to the invention, cipher key generation and sharing processes using a public key cryptographic system in network communications are well known, the present invention can apply these well-known techniques.

In the following, we describe in detail the concept of a group key according to the present invention. A group key is a key in a common key encryption to be shared by all members of a group, and communications being passed through the group is encrypted by this group key.

When a member joining/leaving happens, the group key should be updated. Although as a method of updating a group key, the scheme known as Logical Key Hierarchy (LKH) that manages a key in a tree structure is highly efficient, it has been designed for a key management server of centralized type.

Thus, the present invention proposes a decentralized key management scheme wherein key management in a tree structure comprised of group members only is implemented, without using a key management server. The scheme shall be hereinafter referred to as FDLKH (Fully Decentralized Key Management Scheme on Logical Key Hierarchy).

The essence of LKH lies in control of encryption cost required for updating a group key once with respect to the number of members n from O(n) to O(log n), by assigning group members to leaves of a logical tree, dividing them into subgroups of each subtree, and a management server distributing a key used for updating a group key to each subgroup.

In FDLKH according to the present invention, members are divided into subgroups by using a two-part tree, and instead of a key management server, one member each is appointed as a representative from each subgroup and becomes responsible for sharing of a DH key and distribution of the key.

With this, the encryption cost could be maintained at O(log n) comparable to LKH, and the number of keys in the entire system could be reduced to almost half when compared with LKH.

Figure 2:
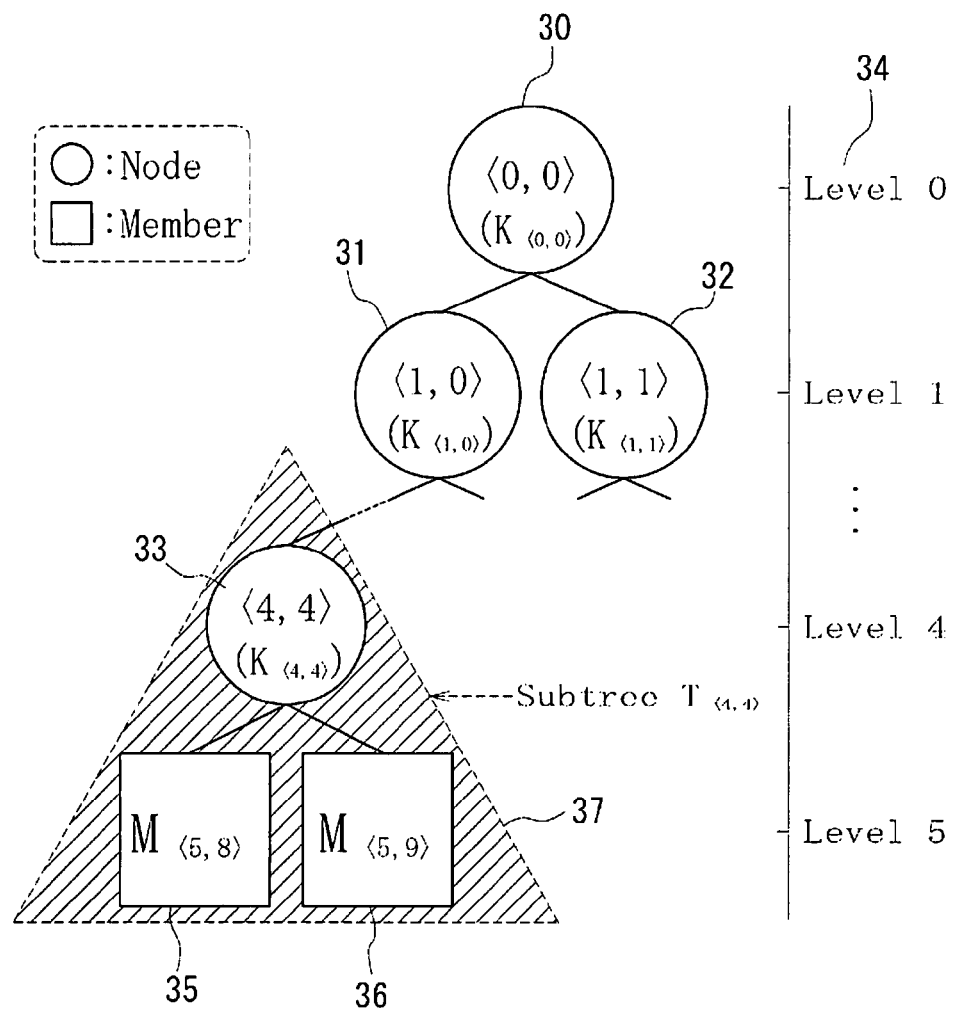
FIG. 2 is an illustration describing a relationship between a node of FDLKH and members.

FIG. 2 is an illustration showing a part of the two-part tree used in FDLKH. Each node of the tree (30) to (33) is expressed as <l,m>, using the tree level (34)l (l=0, 1, 2, ...)

and a position m (0 m $2^l-1$) at that level (34). Thus, a node (31) at a position 0 (left end) at level 1 is <1,0>.

Group members are assigned to nodes without children (in other words, leaves). In the following, such assignment shall be expressed as "a member occupies a node". Members who occupy a node <l,m> are expressed as M<l,m>. For instance, members who are leaves of a node <4,4> are M<5,8> (35) and M<5,9> (36).

A key is assigned to a node not occupied by members, and a key assigned to node <l,m> is expressed as K<l,m>.

The K<l,m> is shared among members belonging to a subtree T<l,m> with the node <l,m> as a root.

For instance, a key to be shared among members belonging to a subtree T<4,4> (37) with the node <4,4> (33) in FIG. 2 as a root is K<4,4>, and called a subgroup key in the present invention.

As K<0,0> is shared by all the members, it is in fact a group key. In the present invention, the members shall retain the group key that is the most significant key and the subgroup keys at each hierarchy.

In other words, the member M<5,8> (35) and the member M<5,9> (36) not only belong to the subtree T<4,4> and share the key K<4,4> but also belong to subtrees (not shown) T<3,2>, T<2,1>, T<1,0>, and T<0,0>. Thus, both the members have the following 5 keys in total: K<4,4>, K<3,2>, K<2,1>, K<1,0>, and K<0,0>.

In fact, a member possesses all keys on paths from its parent node (a one-level higher node) to a root node <0,0> (the most significant node).

Figure 3:
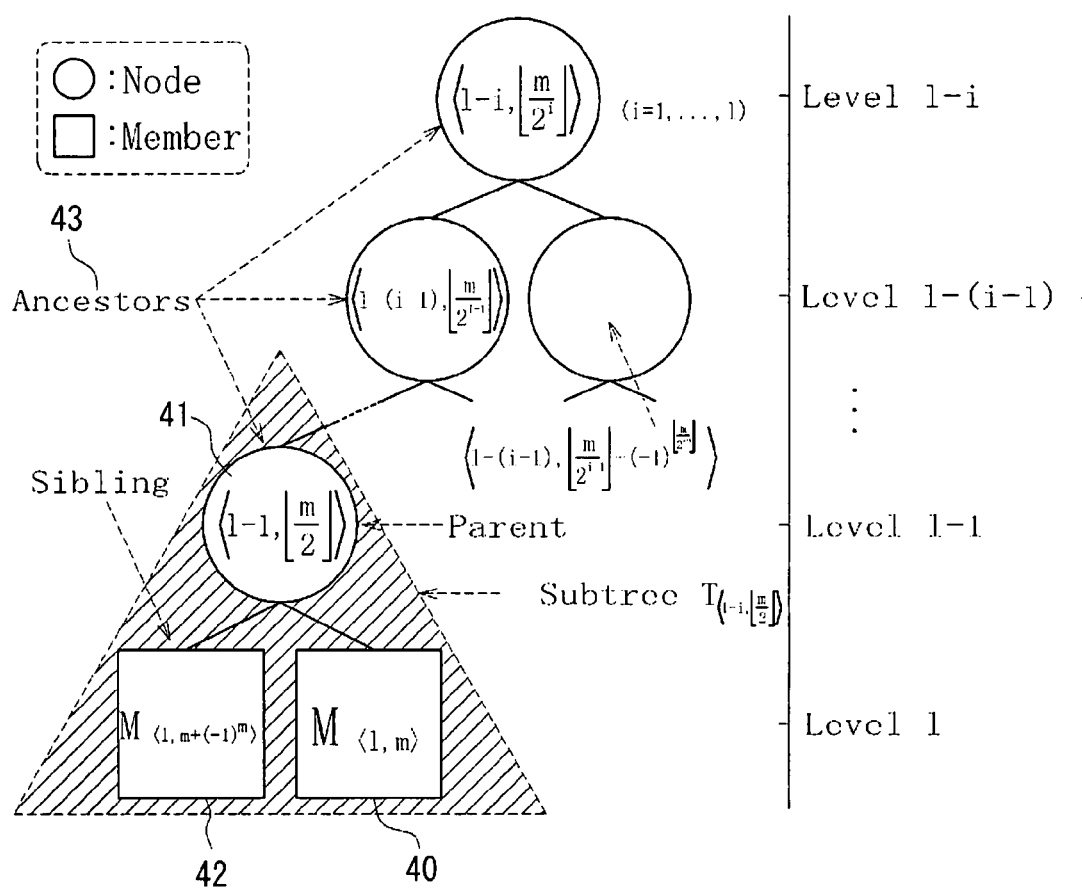
FIG. 3 is an illustration in which a relation between a node of FDLKH and members is generalized.

FIG. 3 is a generalization of a two-part tree with the member M<l,m> (40) occupying the node <l,m> as an origin. A parent node of M<l,m> is expressed by <l-1,[m/2]> (41) and a sibling member (a member belonging to a same parent node) is M<l,m+$(-1)^m$> (42).

Ancestor nodes (43) that are all nodes from the parent node to a root node are generalized as <l-i,[m/$2^i$]> (i=, ... , ). Thus, the subtree to which M<l,m> belongs and the key it possesses can be expressed as T<l-i,[m/$2^i$]> and K<l-i[m/$2^i$]>, respectively.

In the present invention, when a member joining/leaving happens, one member is appointed as a representative of each subtree having, as a root, a node that requires updating of a key. Those representatives shall be responsible for a key updating process. Thus, it is possible to distribute the processing of the key management which conventionally uses a key management server to representative members.

Those members shall be called a "captain", and a captain representing the subtree T<l,m> is expressed as C<l,m>.

Representing a subtree rooted in a node that will require key manipulation when a member joining/leaving happens, a captain shall be responsible for key sharing and distribution processes. When a member joins, respective captains of subtrees and the joining member performs DH key sharing, while the captains performs DH key sharing with each other when a member leaves.

The respective captains distribute the resulting shared keys to the members of the subtrees. There is one node that requires key manipulation when the member M<l,m> joins or leaves, and thus one member is selected as a captain.

A member who becomes a captain of a subtree is selected from descendents located on a branch opposed to a branch where a joining/leaving member is located, when viewed from a root node of the subtree.

Figure 4:
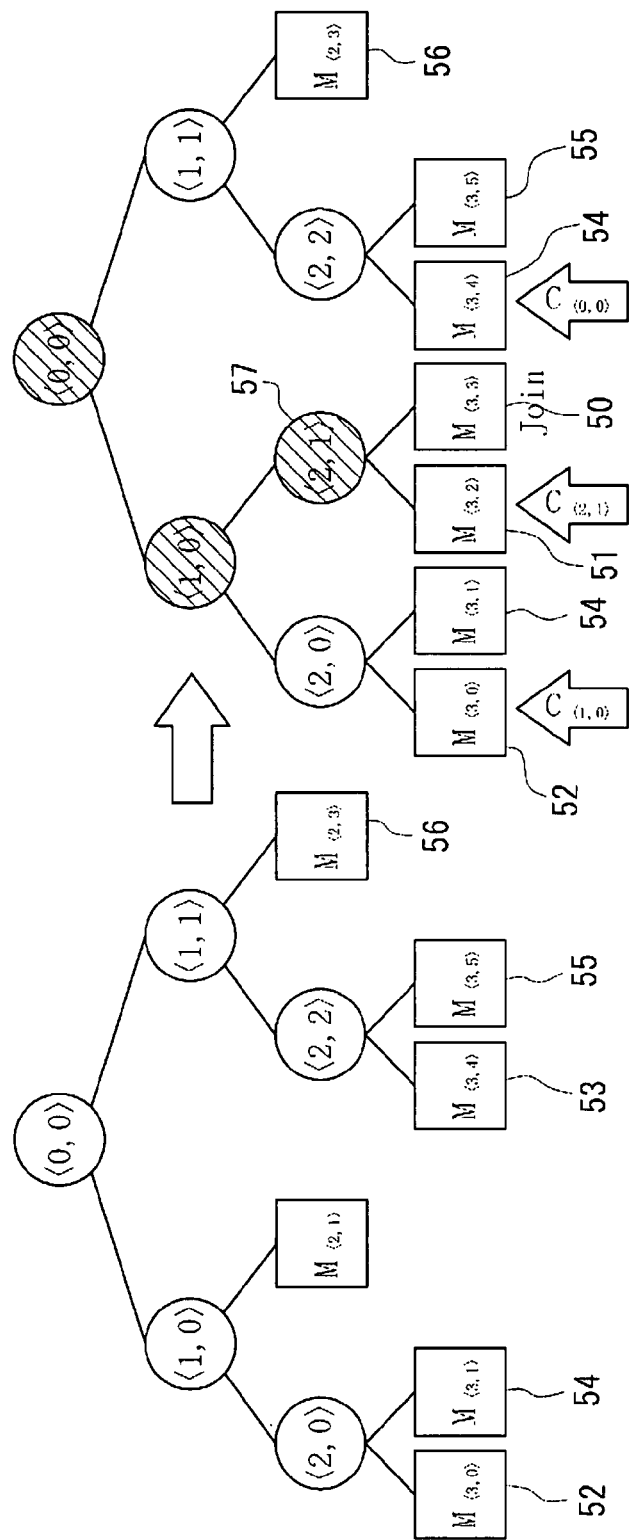
FIG. 4 is an illustration describing the process of when a member joins according to a scheme of the invention.

FIG. 4 is an example of when the member M<3, 3> (50) joins, and the member M<3,2> (51) who is a descendent of a branch opposite to the node <2,1> is selected as the captain C<2,1> of the subtree T<2,1>. Similarly, the member M<3, 0> (52) is selected as the captain C<1,0> of the subtree T<1,0> and the member M<3,4> (53) is selected as the captain C<0,0> of the subtree (the entire tree structure) T<0,0>.

Figure 5:
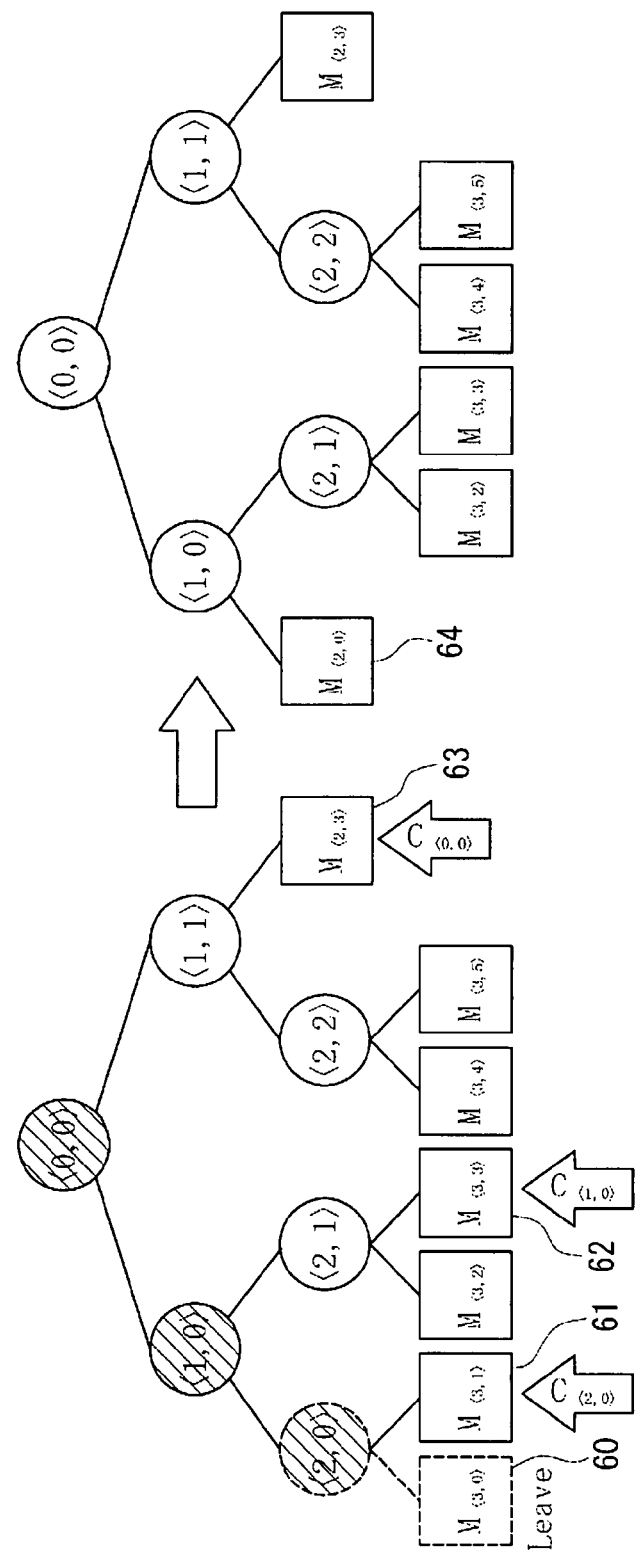
FIG. 5 is an illustration describing the process of when a member leaves according to the scheme of the invention.

Similarly, FIG. 5 is an example of when the member M<3, 0> (60) leaves, and the members M<3,1> (61), M<3,3> (62) and M<2,3> (63) will be the captains C<2,0>, C<1,0> and C<0,0>, respectively.

In the following, we look at the case in which there is more than one member in a subtree who can be a captain candidate. For instance in FIG. 4, M<3,0> (52) and M<3,1> (54) are captain candidates at T<1,0>, and M<3,4> (53), M<3,5> (55), and M<2,3> (56) are captain candidates at T<0,0>.

In the present invention, each member determines in the captainship determination unit (13) whether or not it will be a captain, by means of a common selection algorithm.

As the simplest selection algorithm, each member refers to tree structure data that it always stores in a memory (21), and, based on the above, determines in sequence whether or not it is a descendent of a branch opposite to a branch where a joining/leaving member resides, when viewed from a root node of the subtree, or when there is more than one descendent, whether or not it is a member at the left end. When it satisfies both conditions, it determines that it is a captain of the subtree.

This method fixes members that can be a captain for each subtree, and is suitable for a group in which calculating abilities of members are varying, and thus it is expected that to some extent processing will concentrate on a member having higher calculating ability. Then, members may be ranked in advance according to their calculating abilities, and a member may determine that it is a captain when it has the highest rank.

Another method is a rotation method wherein a role of captain is rotated among captain candidate members. The method is suited to a group in which members are in a fifty-fifty relationship and flattened load is expected. Thus, for instance, the selection algorithm whereby captainship is rotated in turn from left to right in a subtree, etc. can be used.

In the decentralized key management scheme of the present invention, tree structure data is updated as described below, when a member joins or leaves. Updating of the tree structure data is processed in the tree structure data updating unit (12) of CPU (10) by a method of rewriting data in the memory (21).

In other words, in the present invention, all members in a group share information in a two-part tree. When a member joins/leaves, each of the members updates the shape of the two-part tree.

When a member joins, as shown in FIG. 4, a joining member (50) joins as a child who is at the lowest level in the two-part tree and to the right of the leftmost node (57). This is the rule in this example. On the contrary, it may join as a child who is to the left (or may be to the right) to the rightmost node <2,3>, for instance. As such, any predetermined rule can be adopted.

In FIG. 4, a joining member will be M<3,3>. When M<3, 3> joins, M<2,1> that occupies the node <2,1> will descend to one lower layer and be a child M<3,2> to the left of the node <2,1>.

Leaving of a member may happen at any node in a two-part tree. In FIG. 5, when M<3,0> (60) leaves, M<3,1> (61) that was a sibling member of M<3,0> (60) will ascend to one higher layer, occupy the parent node <2,0>, and be M<2,0> (64). If a sibling node of a leaving member is not occupied by a member (for instance, when M<2,3> (63) in FIG. 5 leaves), the subtree itself having that sibling node as a root will ascend to the higher layer, and names of descendent nodes of the subtree will be updated. In fact, T<2,2> shall be T<1,1>.

As described above, when each member detects a joining or leaving of a member from network in the joining/leaving detection unit (11), following the above rule, when a member joins, it lets the member join as a child at the lowest level in the two-part tree and to the right of the leftmost node (57), and then the tree structure data is updated. When a member leaves, the member lets a sibling member to ascend to one higher layer, or when the sibling node is not occupied by a member, it lets a subtree itself rooted in the sibling node ascend to the higher layer, and then the tree structure data is updated.

A captain of a subtree rooted in a parent node of a joining member transmits information of the two-part tree to a joining member, who then stores it in the memory (21).

In addition, if the number of members prior to the joining is the power of 2 and a complete two-part tree is formed, a new root node <0,0> may be created, the original root node may be moved to <1,0>, names of descendent nodes under <1,0> may be updated, and the joining member may be M<1,1> to the right of the root node.

The present invention is characterized in that without using a conventional key management server, a captain generates a group key and a subgroup key, and distributes them to respective members. The new key generation and distribution means may arbitrary define aspects of generation and distribution.

When a member joins/leaves, keys to be assigned to nodes in a two-part tree are generated, changed or discarded in order to update a group key. The three processes are collectively called "key manipulation".

Nodes that require key manipulation when a member joins/leaves are all ancestor nodes from a parent node of a joining or leaving member to a root node. In the example of joining member in FIG. 4, the nodes that require key manipulation are <2,1>, <1,0>, and <0,0>. Now, a key of the node <2,1> is newly generated.

In the example of leaving member in FIG. 5, the nodes that require key manipulation are <2,0>, <1,0>, and <0,0>. Now, the key of the node <2,0> is discarded.

To discard a key, no cooperation with other members is needed, and each member having a key to be discarded performs the process. Generation/change of a key requires cooperation with other members. In general, when M<l,m> joins a group, nodes that require generation/change of a key can be expressed as $<l-i,[m/2^i]>$ (i=1, ..., l). On the one hand, when M<l,m> leaves a group, nodes that require a change of a key can be expressed as $<l-j,[m/2^j]>$ (j=1, ..., l) that exclude a parent node before the key is discarded.

In the following, we elaborately describe two examples of a joining member and two examples of a leaving member, respectively, in Example 2 to 5 as embodiments.

EXAMPLE 2

Figure 6:
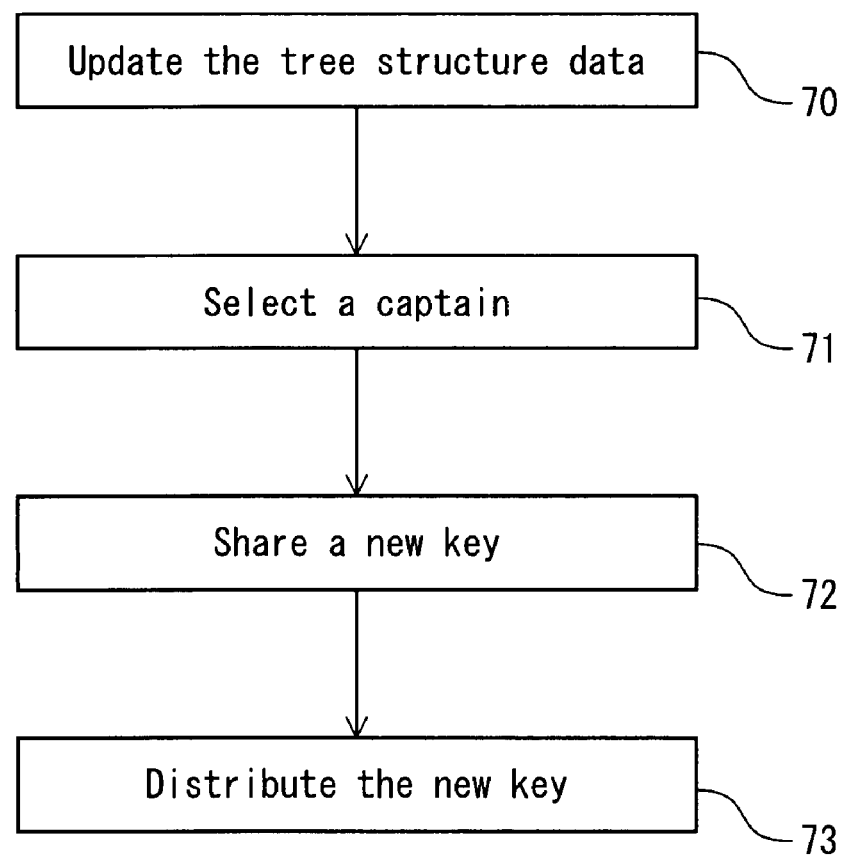
FIG. 6 is a flow chart of the process of when a member joins according to the scheme of the invention.

First of all, configuring the new key generation and distribution means of when a member joins, with a new key sharing unit (14) and a new key distribution unit (15) of CPU (10), we describe the example of processing join protocol as shown in FIG. 6 (this scheme is referred to as the FDLKH dedicated scheme).

As described above, when a member (50) joins and the joining/leaving detection unit (11) detects it, the tree structure data updating unit (12) of each member performs update process (70) of the tree structure data. Next, each member performs a process of the captainship determination unit (13), and a captain in the tree structure is selected (71).

The captain (51) transmits the tree structure data to the joining member (50).

Then, it proceeds to new key sharing process (72). Now, DH key sharing is used to generate/change a new key. When a member joins, a joining member and each captain share a DH key. Each captain inputs the value shared in DH key sharing in unidirectional hash function h that is secure cryptographically. Then, it makes output thus obtained a key of common key encryption to be assigned to a root node of a subtree.

In FIG. 4, a joining member M<3,3> and members selected as a captain M<3,2>, M<3,0>, and M<3,4> calculate the following, by using a secret random number $X_{M<l,m>} \in Z_{p-1}$ that a generator g of a prime number p and $Z_p^*$ that are published information and each member have, respectively, through processing of the new key sharing unit (14).

$$Y_{M<l,m>} = g^{X_{M<l,m>}} \bmod p \qquad \text{(Mathematical Expression 1)}$$

M<3,3> and each captain M<3,2>, M<3,0>, and M<3,4> transmit result of the mathematical expression 1 as shown below. Although they transmit it in unicast or multicast, addition of a digital signature, etc., is needed to prevent man-in-the-middle attack. The unicast or multicast transmission method and the technique to add a digital signature are well known.

M<3,3>→[M<3,2>,M<3,0>,M<3,4>]: $Y_{M<3,3>}$
M<3,2>→[M<3,3>]: $Y_{M<3,2>}$
M<3,0>→[M<3,3>]: $Y_{M<3,0>}$
M<3,4>→[M<3,3>]: $Y_{M<3,4>}$

In the above, A→B:X indicates that A transmits data X to B.

When each member receives the result of the mathematical expression 1 in the new key sharing unit (14), it executes a power-residue operation of DH key sharing, and calculates by inputting a resulting value into a hash function h. This enables M<3,3> and M<3,2>, M<3,0> and M<3,4> to share the following keys respectively:

$K'<2,1> = h(g^{XM<3,3> \cdot XM<3,2>} \bmod p)$
$K'<1,0> = h(g^{XM<3,3> \cdot XM<3,0>} \bmod p)$
$K'<0,0> = h(g^{XM<3,3> \cdot XM<3,4>} \bmod p)$ When the new key sharing process (72) as described above completes, then, the captain has the new key distribution unit (15) perform new key distribution process (73) for distributing the shared new keys to other members in the subtree. When a member joins, it encrypts the new key with the old keys prior to joining and distributes them to the members in the subtree.

In FIG. 4, M<3,0> (52) and M<3,4> (53) representing the subtree encrypt new keys K'<1,0> and K'<0,0> with the old keys K<1,0> and K<0,0>, and distribute them to each subtree. In other words,

M<3,0>→T<1,0>: E(K<1,0>,K'<1,0>)
M<3,4>→T<0,0>: E(K<0,0>,K'<0,0>)

where E(K,X) represents an encrypted text of data X by the key K of the common key encryption.

When the new keys are distributed, respective members of the group decrypt the new keys, assign them to corresponding nodes, and update all subgroup keys and group keys.

In intra-group communications, encryption with the new group key is performed.

FIG. 8 is a flow chart of generalized processes of the above join protocol. In FIG. 8, 1 to 6 are for l=1, while 7 to 13 are for l=2 or greater. 2 and 8 represent the tree structure data update (70) process, 3 and 9 represent the captain selection (71) process, 4 and 10 represent sharing of new keys (72), and 5 to 6 and 11 to 13 represent distribution of new keys (73), respectively.

EXAMPLE 3

Next, another example of the new key sharing process (72) and the new key distribution process (73) when a member joins is shown below (the scheme is referred to as FDLKH distributed scheme).

First, in the new key sharing process (72), rather than the joining member M<3,3> (50) sharing the keys with the captains M<3,2>, M<3,0>, and M<3,4> as in Example 2, the joining member M<3,3> (50) shares the captain M<3,2> (51) at the lowest level, and then that captain M<3,2> (51) sequentially shares the new keys with M<3,0> (52), M<3,0> (52) and M<3,4> (53).

In other words, as shown in the following,
M<3,3>←→M<3,2>: K'<2,1>
M<3,2>←→M<3,0>: K'<1,0>
M<3,0>←→M<3,4>: K'<0,0>
(←→shows sharing.)
the subgroup key and the group key are shared among the respective members.

Then, in the new key distribution process (73), similar to Example 2, the captain distributes new keys to the subtree with the following:
M<3,0>→T<1,0>: E(K<1,0>,K'<1,0>)
M<3,4>→T<0,0>: E(K<0,0>,K'<0,0>)

In addition, in the new key sharing process (72) in this example, as the joining member M<3,3> receives K'<2,1> only, it is configured that the members M<3,2> (51) and M<3,0> (52) encrypt new keys that are one level higher with lower keys and sequentially transmit them. In other words, the following process
M<3,2>→M<3,3>: E(K'<2,1>,K'<1,0>)
M<3,0>→M<3,3>: E(K'<1,0>,K'<0,0>)
are performed together in the new key distribution process (73). With the processes above, all the subgroup keys and the group keys are also distributed to the joining member (50), and each member can update the keys.

FIG. 9 is a flow chart of generalized processes of the above join protocol. In FIG. 9, 1 to 6 are for l=1, 7 to 15 are for l=2 or greater, 2 and 8 represent the tree structure data update (70) process, 3 and 9 represent the captain selection (71) process, 4 and 10 to 11 represent sharing of new keys (72), and 5 to 6 and 12 to 15 represent distribution of new keys (73), respectively.

EXAMPLE 4

Figure 7:
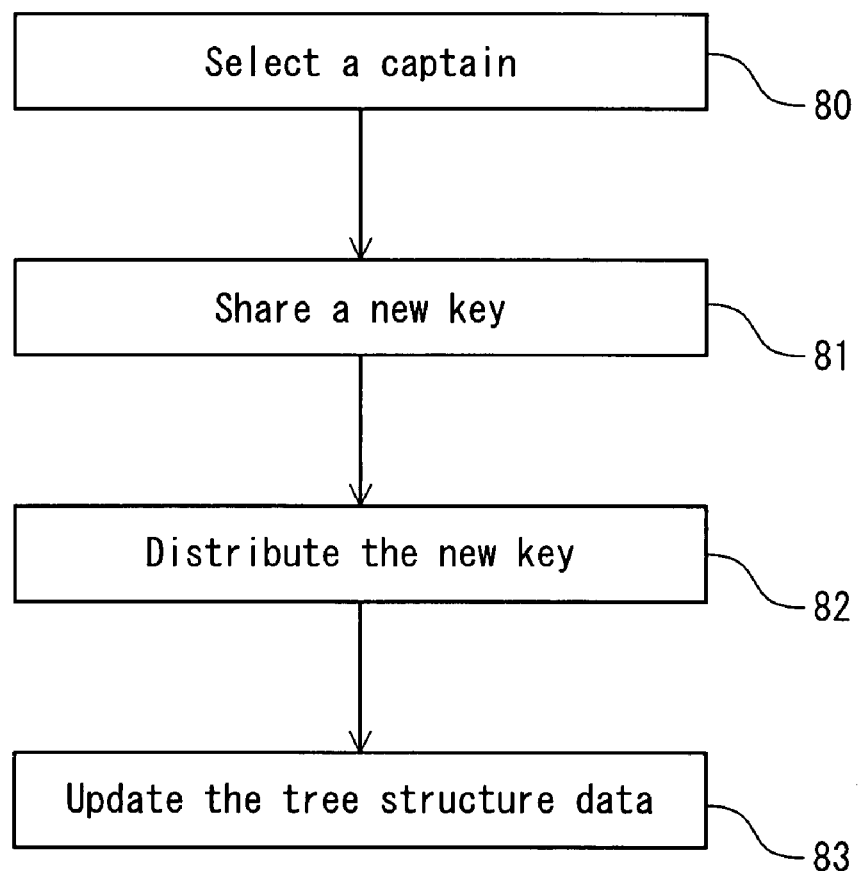
FIG. 7 is a flow chart of the process of when a member leaves according to the scheme of the invention.

In the following, we describe the process (dedicated scheme) of when a member leaves, corresponding to Example 2. FIG. 7 shows leave protocol when a member leaves.

As described above, when a member (60) leaves, and the joining/leaving detection unit (11) detects it, each member performs the process of the captainship determination unit (13), and a captain in the tree structure is selected (80).

Then, it proceeds to the new key sharing process (81). Now, DH key sharing is used to generate/change a new key. When a member joins, a joining member and each captain share a DH key. Each captain inputs the value shared in DH key sharing in unidirectional hash function h that is secure cryptographically. Then, it makes output thus obtained a key of common key encryption to be assigned to a root node of a subtree.

In the example of when a member leaves in FIG. 5, M<3,1> (61) selected as a captain of the subtree T<2,0> and M<3,3> (62) and M<2,3> (63) selected as other captains transmit the result of the mathematical expression 1 described above, as shown below:
M<3,1>→[M<3,3>,M<2,3>]: $Y_{M<3,1>}$
M<3,3>→M<3,1>]: $Y_{M<3,3>}$
M<2,3>→M<3, 1>: $Y_{M<2,3>}$ When each member receives the result of the mathematical expression 1 in the new key sharing unit (14), it executes a power-residue operation of DH key sharing, and calculates by inputting a resulting value into a hash function h. This enables M<3,1>, M<3,3>, and M<2,3> to share the following keys:
K'<1,0>=h($g^{XM<3,1>XM<3,3>}$ mod p)
K'<0,0>=h($g^{XM<3,1>XM<2,3>}$ mod p)

Then, the new key distribution unit (15) performs the new key distribution process (82). When a member leaves, it encrypts a new key by using the key of the node that is one layer lower than the root note of the subtree, and distributes it to the members of the subtree. Furthermore, using the distributed new key, the captain of the subtree rooted in the parent node of the leaving member encrypts keys missing in each subtree and distributes them.

In FIG. 5, M<3,3> and M<2,3> encrypts the new keys K'<1,0> and K'<0,0> with the keys K<2,1> and K<1,1>, and distributes them to the respective subtree. In fact,
M<3,3>→T<2,1>: E(K<2,1>,K'<1,0>)
M<2,3>→T<1,1>: E(K<1,1>,K'<0,0>)

Then, M<3,1> encrypts the key K'<0,0> missing in the subtree T<1,0> by using K'<1,0> distributed earlier, and distributes it. In fact, it distributes as follows:
M<3,1>→→T<1,0>: E(K'<1,0>,K'<0,0>)

Then, after distribution of the key, each member of the group decrypts the new key, assigns it to the corresponding node, and updates the key.

In addition, each member causes the tree structure data updating unit (12) to perform the tree structure data update process (83), and completes the leave process.

FIG. 10 is a flow chart of generalized processes of the above leave protocol. In FIG. 10, 1 to 3 are for l=1, 4 to 10 are for l=2, and 11 to 18 are for l=3 or greater. Then, when l=1, ?? represents the process of deleting the root node and updating the subtree name, and in other cases, 5 to 12 represent the captain selection (80) process, 6 and 13 represent sharing of new keys (81), 7 to 9 and 14 to 17 represent distribution of new keys (82), and 10 and 18 represent the tree structure data update process (83).

EXAMPLE 5

Another protocol (distributed scheme) of when a member leaves can be configured as described below. This method corresponds to the join protocol as shown in Example 3.

In Example 4, the new key sharing unit (14) and M<3,1> 61, and M<3,3> (62) and M<2,3> (63) share the keys K'<1,0> and K'<0,0>. However, in this example, M<3,1> (61) and M<3,3> (62) share K'<1,0>, while M<3,3> (62) and M<2,3> (63) share K'<0,0>.

Then, in the new key distribution process (82), M<3,3> (62) transmits the new key K'<1.0> encrypted with K<2,1> to the subtree T<2,1>, while M<2,3> (63) transmits the new key K'<0,0> encrypted with K<1,1> to the subtree <1,1>.

Furthermore, M<3,3> (62) encrypts the new key K'<0,0> with K'<1,0> and transmits it to the subtree T<1,0>.

FIG. 11 is a flow chart of generalized processes of the above leave protocol. In FIG. 11, 1 to 3 is for l=1, 4 to 10 is for l=2, and 11 to 18 is for l=3 or greater. Then, when l=1, ?? represents the process of deleting the root node and updating the subtree name, and in other cases, 5 to 12 represent the captain selection (80) process, 6 and 13 represent sharing of new keys (81), 7 to 9 and 14 to 17 represent distribution of new keys (82), and 10 and 18 represent the tree structure data update process (83).

Evaluation Experiment

Result of the evaluation experiment of FDLKH according to the present invention is shown below. In the experiment, a comparison of the number of keys and cost required for updating a group key when a member joins/leaves (the number of DH key sharing processes, the number of encrypting/decrypting processes by the common key encryption) is made.

As a target of comparison, costs of two key management schemes (Flat and LKH) that employ a key management server for intensively managing keys are also shown together. Now, Flat refers to naive star type schemes that share discrete common keys (hereinafter referred to as a discrete key) among the key management server and members, and do not assign other hierarchical keys. LKH refers to schemes described as related art that similarly share a discrete key among the key management server and members, and further manage a key for updating a group key in the tree structure.

To simplify evaluation, the degree of the tree of the key to be used in LKH (the number of children possessed by each node) shall be 2, and for both LKH and FDLKH, the number of members n after joining or before leaving of a member is the power of 2 and the key tree shall be a perfect two-part tree.

Then, if it is assumed that a joining/leaving member is M<l,m>, l=$\log_2$n can work out.

Table 1 shows the number of keys to be held by one member as well as the total number of key types of the entire system in the three schemes of Flat, LKH, and FDLKH. Since FDLKH does not use a key management server and thus there exists no discrete key of each member, the number of keys per member is smaller by 1 than LKH, and the total number of key types is almost half of that of LKH.

TABLE 1

|       | Total Number of Keys | Number of Keys per Member |
|-------|----------------------|---------------------------|
| Flat  | n + 1                | 2                         |
| LKH   | 2n − 1               | l + 1                     |
| FDLKH | n − 1                | l                         |

Next, Table 2 shows cost of when a member joins. Regular members in Table 2 refer to members other than a captain and a joining member, while the number of times is for each one node.

When M<l,m> joins a group, while the joining member (newcomer) performs decrypting once with a discrete key in LKH, the joining member and respective captains performs DH key sharing once in total in FDLKH.

FDLKH according to the present invention does not require a key management server. Although it is serverless, instead, the amount of calculations of the joining member increases, compared with that of LKH. However, Flat or LKH separately requires cost for sharing a discrete key among the key management server (Key server) and the members (Members), and thus the total cost is lower in FDLKH.

In addition, it is shown that the processes are distributed in the distributed scheme, in comparison with the dedicated scheme in which the processes for joining/leaving protocol concentrated on one member.

TABLE 2

|                     | Node           | Number of DH Key Sharing | Number of Encoding | Number of Decoding |
|---------------------|----------------|--------------------------|--------------------|--------------------|
| Flat                | Newcomer       |                          |                    | 1                  |
|                     | Member         |                          |                    | 1                  |
|                     | Key server     |                          | 2                  |                    |
| LKH                 | Newcomer       |                          |                    | 1                  |
|                     | Member         |                          |                    | 2                  |
|                     | Key server     |                          | 2l                 |                    |
| FDLKH (dedicated)   | Newcomer       | 1                        |                    |                    |
|                     | Regular member |                          |                    | 2                  |
|                     | Captain        | 1                        | 1                  | (l − 1)/2          |
| FDLKH (distributed) | Newcomer       | 1                        |                    | l − 1              |
|                     | Regular member |                          |                    | 2                  |
|                     | Captain        | (2l − 1)/2               | (2l − 2)/2         | (l − 1)(l − 2)/2l  |

In LKH, the average number of decrypting processes by members is twice or lower. Similarly, in FDLKH, the average number of decrypting processes by regular members other than the captain and the joining/leaving member is twice or lower. In LKH, the number of encrypting processes by the key management server is 2l times, half of which are encryptions for distributing keys to subtrees.

In FDLKH (dedicated scheme), each captain performs encrypting for the key distribution once (l−1 times in total). In addition, the average number of decrypting processes by captains is (0+1+ . . . +l−1)/l=(l−1)/2.

Figure 12:
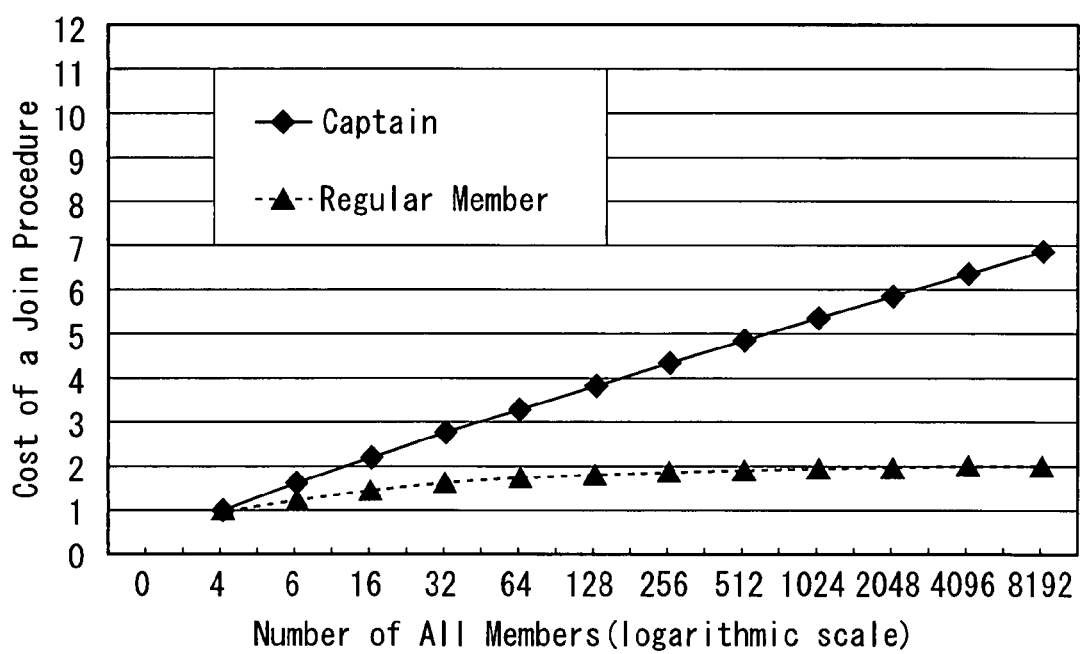
FIG. 12 is a graph showing variations in the cost of a common key encryption system with respect to the number of members when a member joins in FDLKH (dedicated scheme).
Figure 13:
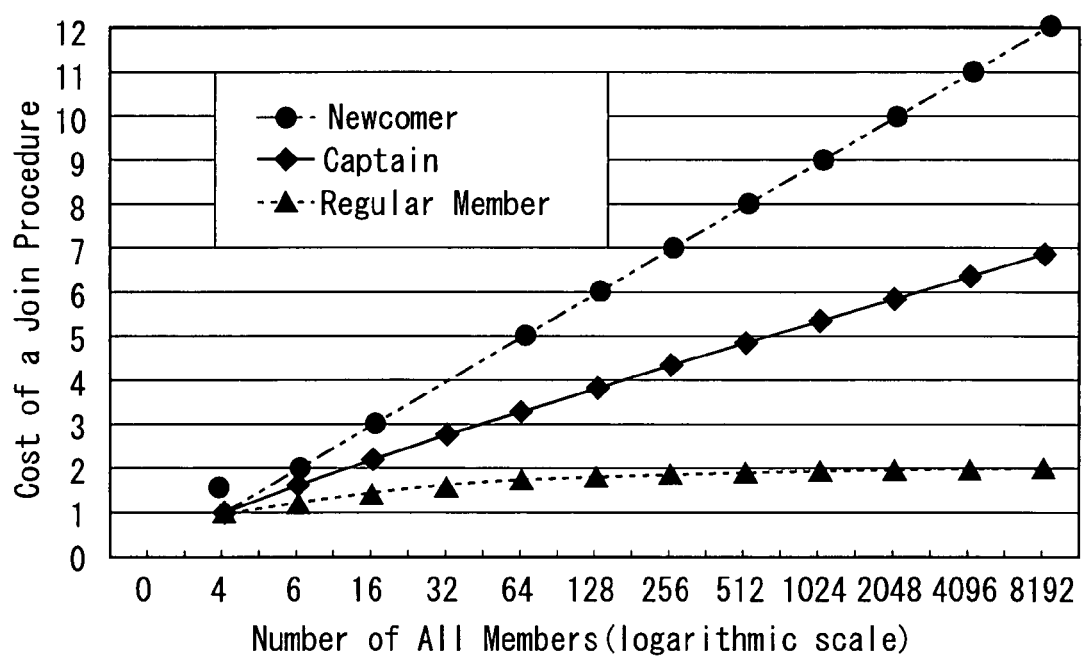
FIG. 13 is a graph showing variations in the cost of a common key encryption system with respect to the number of members when a member joins in FDLKH (distributed scheme).

FIG. 12 and FIG. 13 show the change in the cost of the common key encryption system (sum of the number of encrypting processes and that of decrypting processes) to the number of the members when a member joins, in FDLKH (dedicated scheme) and FDLKH (distributed scheme), respectively.

Then, cost of when a member leaves is studied. If M<l,m> leaves the group, as shown in Table 3, in Flat scheme, it is necessary that the key management server encrypt a new group key with n−1 discrete keys other than the leaving member (seceder), and distribute it to the respective members. Thus, scalability is low.

In LKH, the tree structure has been introduced into key management, and the number of encrypting processes by the key management server is controlled to 2l times.

In FDLKH, the captain (generous captain) of the subtree rooted in the parent node of the leaving member performs l−1 DH key sharing processes and l−2 encrypting processes for key distribution. Other respective captains perform one DH key sharing process and one encrypting process (l−1 times in total). The average number of decrypting processes by the captains is (0+1+ . . . +l−2)/(l−1)=(l−2)/2.

Figure 14:
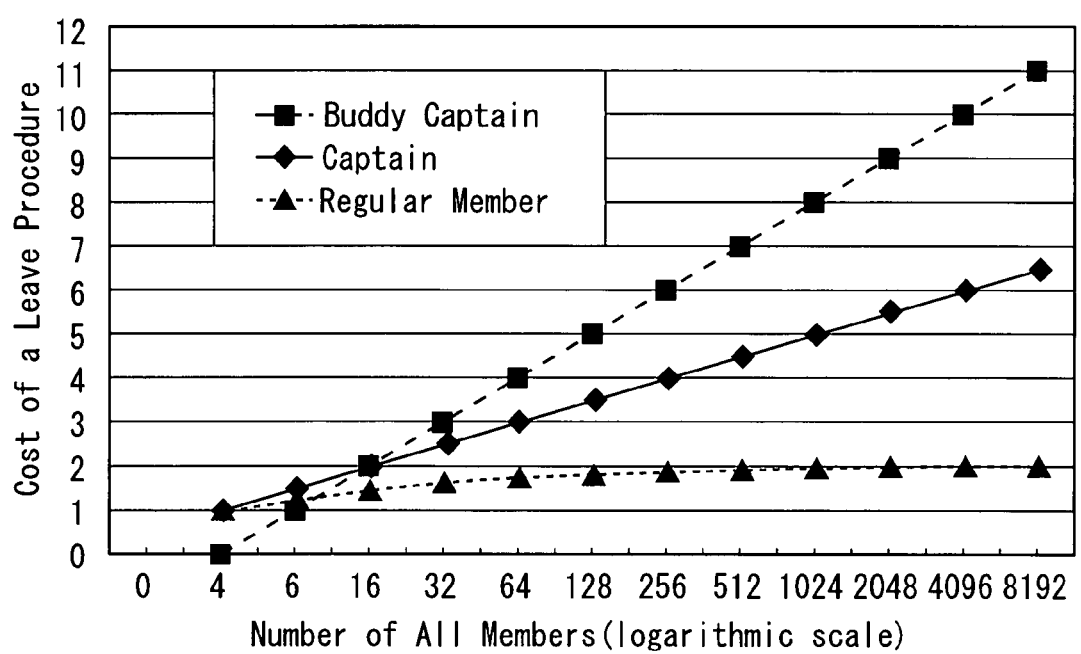
FIG. 14 is a graph showing variations in the cost of a common key encryption system with respect to the number of members when a member leaves in FDLKH (dedicated scheme).
Figure 15:
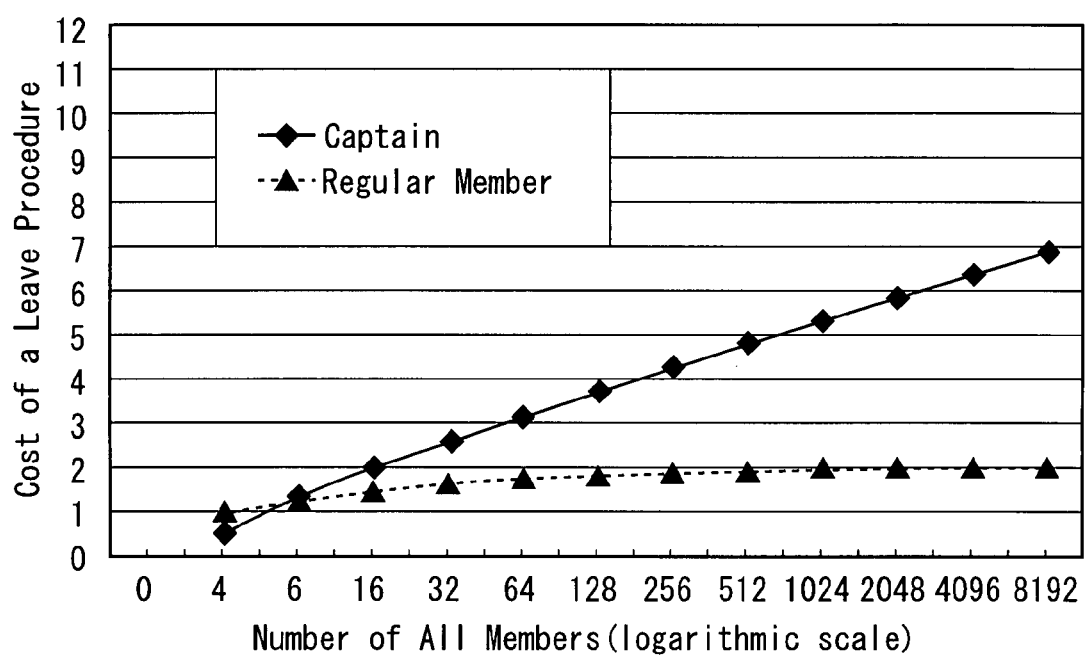
FIG. 15 is a graph showing variations in the cost of a common key encryption system with respect to the number of members when a member leaves in FDLKH (distributed scheme).

FIG. 14 and FIG. 15 show the change in the cost of the common key encryption system to the number of members of when a member leaves in FDLKH (dedicated scheme) and FDLKH (distributed scheme), respectively. The Buddy captain represents the captain closest to the leaving member (M<3,1> (61) in Example 5).

TABLE 3

|      |            | Number of Times |
|------|------------|-----------------|
| Flat | Seceder    |                 |
|      | Member     | 1               |
|      | Key server | n − 1           |
| LKH  | Seceder    |                 |
|      | Member     | 2               |
|      | Key server | 2l              |

TABLE 3-continued

| | | Number of Times | | |
|---|---|---|---|---|
| FDLKH (dedicated) | Seceder | | | |
| | Regular member | | | 2 |
| | Captain | 1 | 1 | (l − 2)/2 |
| | Buddy Captain | l − 1 | l − 2 | |
| FDLKH (distributed) | Seceder | | | |
| | Regular member | | | 2 |
| | Captain | (2l − 2)/l | (2l − 3)/l | (l − 1)(l − 2)/2l |

The invention claimed is:

1. A communications method comprising: organizing a group to which a plurality of members can join or leave, a group key for use in encryption or authentication of communication data is not only shared in the group, but also assigned to a most significant root, a subgroup key is assigned to nodes that are branching points of branches, each member is assigned to a leaf at the end of a least significant subtree, and each member communicates by retaining the group key and all subgroup keys from the group key to itself, wherein each member belonging to the group stores in advance tree structure data of the entire group, the group key, and all the subgroup keys, when each member detects that a new member joins, a tree structure data updating step in which each member causes tree structure data updating means to assign a joining member to a leaf of the tree structure according to a predetermined rule, and to update the tree structure data stored by each member;

a captainship determination step in which each member causes captainship determination means to determine whether or not the member will be a captain of a subtree according to a predetermined rule from new tree structure data;

a new key generation and distribution step in which the captain causes new key generation and distribution means to generate and distribute new keys at least among respective members of its subtree, wherein the captain is a member assigned to a leaf and the captain generates and distributes a subgroup key to each member of the subgroup; and wherein, in the captainship determination step, a predetermined rule for determining whether to be a captain or not selects a captain candidate member in a subtree from members of leaves of a branch opposite to a branch where a joining member lies, when viewed from the high level of the subtree.

2. The communication method using the decentralized key management scheme according to claim 1, wherein the new key generation and distribution step in the communication method includes:

a new key sharing step in which the joining member and each captain cause the new key sharing means to communicate generation information of a new group key or subgroup keys, and generate and share a new key; and a new key distribution step in which each captain causes the new key distribution means to encrypt the new key with the prior group key or subgroup keys, and distribute the key (s) to each member of the subtree.

3. The communication method using the decentralized key management scheme according to claim 1, wherein the new key generation and distribution step in the communication method includes:

a new key sharing step in which not only a joining member and a least significant captain share a new key, but also lower captains sequentially share a new key with a captain at one level higher in the hierarchy; and a new key distribution step in which each captain causes the new key distribution means not only to encrypt the new key with the corresponding prior group key or subgroup keys and distribute the key(s) to each member of the subtree, but also to encrypt a new key of one level higher in the hierarchy with the new key of the subtree to which the captain belongs and to transmit the encrypted key to the joining member sequentially from the lower captains.

4. The communication method using the decentralized key management scheme according to any of claims 1 to 3, wherein, in the tree structure data updating step, a predetermined rule for assigning a joining member to a leaf assigns it as the leftmost leaf in the least significant node at the rightmost in the entire tree structure, or as the rightmost leaf in the least significant node at the leftmost.

5. The communication method using the decentralized key management scheme according to any of claims 1 to 3, wherein the tree structure is a two-part tree.

6. A communications method comprising: organizing a group to which a plurality of members can join or leave, a group key for use in encryption or authentication of communication data is not only shared in the group, but also assigned to a most significant root, a subgroup key is assigned to nodes that are branching points of branches, each member is assigned to a leaf at the end of a least significant subtree, and each member communicates by retaining the group key and all subgroup keys from the group key to itself, wherein each member belonging to the group stores in advance tree structure data of the entire group, the group key, and all the subgroup keys, when each member detects that a member leaves, a captainship determination step in which each member causes captainship determination means to determine whether or not the member will be a captain in a subtree from the tree structure data excluding the leaving member according to a predetermined rule;

a new key generation and distribution step in which the captain causes new key generation and distribution means to generate and distribute new keys among at least its subtree members and other captains, wherein the captain is a member assigned to a leaf and the captain generates and distributes a subgroup key to each member of the subgroup, wherein, during captainship determination, a predetermined rule for determining whether to be a captain or not selects a captain candidate member in a subtree from members of leaves of a branch opposite to a branch where a joining member lies, when viewed from the high level of the subtree; and a tree structure data updating step in which each member causes tree structure data updating means to re-assign members of the subtree to which the leaving member belongs and updates the tree structure data stored in the member according to a predetermined rule.

7. The communication method using the decentralized key management scheme according to claim 6, wherein the new key generation and distribution step in the communication method includes:

a new key sharing step in which captains in the least significant subtree where the member has left and all other captains in the subtree to which the leaving member belong cause new key sharing means to communicate generation information on a new group key or subgroup keys and generate and share the new key; and a new key distribution step in which not only each captain causes new key distribution means to encrypt the generated new key with the prior subgroup key of one level lower in the hierarchy and to distribute it to each member of the subtree, but also the captain in the least significant subtree where the member has left causes the new key distribution means to encrypt the missing new key with the prior subgroup key of the subtree, and to distribute it to each member of the subtree.

8. The communication method using the decentralized key management scheme according to claim 6, wherein the new key generation and distribution step in the communication method includes:

a new key sharing step in which starting with captains of the least significant subtree where the member has left, the lower captain sequentially shares the new key with the captain of one level higher in the hierarchy; and a new key distribution step in which each captain not only causes new key distribution means to distribute a new key to each member of its subtree, but also the captain of the subtree where the member has left causes the new key distribution means to encode a missing new key with the prior subgroup key of that subtree and distribute it to each member of the subtree.

9. The communication method using the decentralized key management scheme according to claim 6, wherein the tree structure is a two-part tree.

10. A communications method comprising: organizing a group to which a plurality of members can join or leave, a group key for use in encryption or authentication of communication data is not only shared in the group, but also assigned to a most significant root, a subgroup key is assigned to nodes that are branching points of branches, each member is assigned to a leaf at the end of a least significant subtree, and each member communicates by retaining the group key and all subgroup keys from the group key to itself, wherein a terminal unit that is each member comprises:
storage means for storing tree structure data of an entire group, a group key, and all subgroup keys;
joining/leaving detection means for detecting when a new member joins the group or when member of the group leaves the group;
tree structure data updating means for either assigning a joining member to a leaf of a tree structure according to a predetermined rule and updating tree structure data stored therein, or re-assigning members of the subtree to which a leaving member belong as a leaf according to a predetermined rule and updating tree structure data stored therein;
captainship determination means for determining, from the tree structure data, whether or not the member will be a captain of the subtree according to a predetermined rule;
new key generation and distribution means for generating and distributing a new key at least among members of its subtree, when it becomes a captain, wherein the captain is a member assigned to a leaf and the captain generates and distributes a subgroup key to each member of the subgroup; and wherein, in the captainship determination step, a predetermined rule for determining whether to be a captain or not selects a captain candidate member in a subtree from members of leaves of a branch opposite to a branch where a joining member lies, when viewed from the high level of the subtree.

11. The communication system using a decentralized key management scheme according to claim 10, wherein the new key generation and distribution means in the communication system includes:

new key sharing means for communicating generation information of a new group key or subgroup keys among the joining member and captains, and generating and sharing a new key; and new key distribution means for encrypting the new key with corresponding prior group key or subgroup key, and distributing it to each member of the subtree.

12. The communication system using a decentralized key management scheme according to claim 10, wherein the new key generation and distribution means in the communication system includes:

new key sharing means in which not only the joining member and the least significant captain share a new key, but also lower captains sequentially share the new key with the captain of one level higher in the hierarchy; and new key distribution means for, when a member is a captain, not only encrypting a new key with the corresponding prior group key or subgroup keys and distributing it to each member of the subtree, but also starting with the lower captains, sequentially encrypting a new key of one level higher in the hierarchy with the new key of the subtree to which the captain belongs and transmit it to the joining member.

13. The communication system using a decentralized key management scheme according to claim 10, wherein the new key generation and distribution means of a terminal unit in the communication system includes:

new key sharing means in which the captain of the least significant subtree where the member has left and all other captains of the subtree to which the leaving member belongs communicate generation information on a new group key and subgroup keys, and generate and share a new key; and new key distribution means for, when a member is a captain, not only encrypting the generated new key with the prior subgroup keys at one level lower in the hierarchy and distributing it to each member of the subtree, but also causing the captain of the least significant subtree where the member has left to encrypt the missing new key with the prior subgroup keys of that subtree and distribute it to each member of the subtree.

14. The communication system using a decentralized key management scheme according to claim 10, wherein the new key generation and distribution means of the terminal unit in the communication system includes:

new key sharing means in which starting with the captains of the least significant subtree where the member has left, the lower captains sequentially share a new key with the captain of one level higher in the hierarchy; and new key distribution means for, when a member is a captain, not only causing the new key distribution means to distribute the new key to each member of its subtree, but also causing the captain of the subtree where the member has left to encrypt the missing new key with the prior subgroup key of that subtree and distribute it to each member of the subtree.

15. The communication system using a decentralized key management scheme according to any of claims 10 to 14, wherein
    the predetermined rule for assigning a joining member to be used in the tree structure data updating means to a leaf assigns as the leftmost leaf in the least significant node at the rightmost in the entire tree structure, or as the rightmost leaf in the least significant node at the leftmost.

16. The communication system using a decentralized key management scheme according to any of claims 10 to 14, wherein the tree structure is a two-part tree.

* * * * *